Jan. 10, 1950
O. VETTERLI
2,494,072
COLOR SELECTOR
Filed Feb. 14, 1949
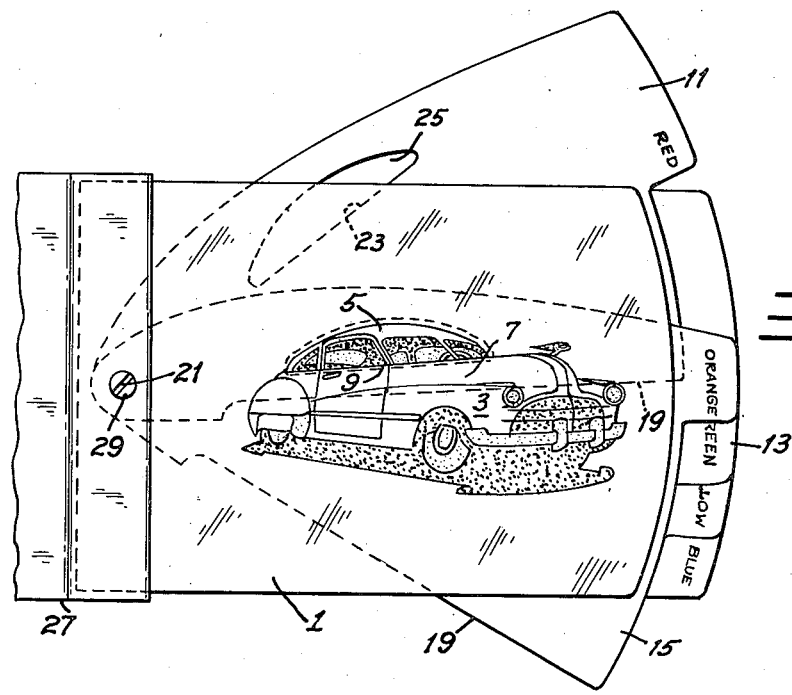
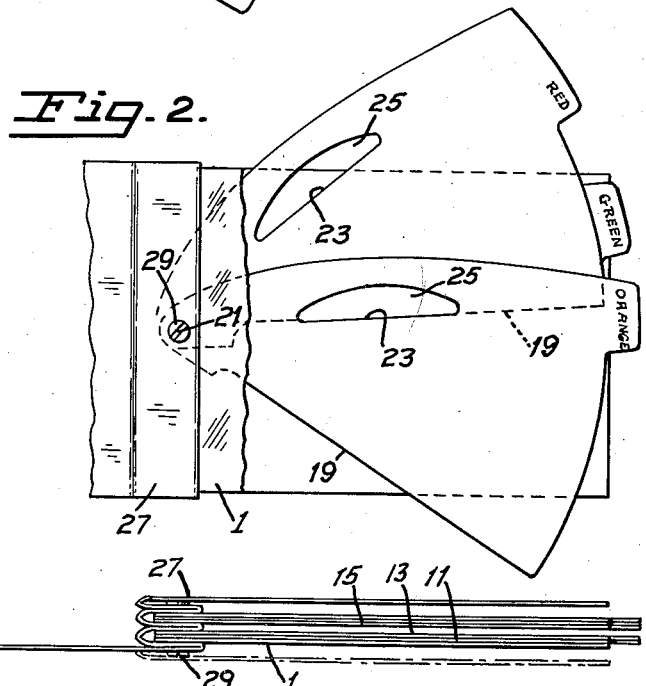
INVENTOR.
ORAN VETTERLI
BY
Bruce & Brosler
HIS ATTORNEYS.

Patented Jan. 10, 1950

2,494,072

UNITED STATES PATENT OFFICE 2,494,072

COLOR SELECTOR

Oran Vetterli, Albany, Calif.

Application February 14, 1949, Serial No. 76,360

7 Claims. (Cl. 35—53)

My invention relates to color selectors, and more particularly to a color selector of the type enabling one to preview various combinations of colors with respect to a particular object under consideration.

In the selection of color combinations for an object under consideration, whether from the viewpoint of purchasing or decorating such an object, or from the viewpoint of redecorating, recoloring or repainting an old or used item, it is desirable to be afforded an opportunity to preview various possible color combinations with respect to such specific object before determining upon a selection of colors.

The present invention is designed to fulfill such purpose, and, in general, accomplishes the same by providing a picture of such item, in which picture, adjacent portions likely to receive different colorings are transparent and separated by a line of differentiation; and for use therewith, a plurality of color sheets each having an edge coincidable with such line of differentiation for one position of such sheet, and a second edge also coincidable with such line of differentiation for another position of such sheet.

By positioning a color card behind such picture with one or the other of such edges coinciding with such line of differentiation, one or another portion of said object will present the color carried by said card, leaving the adjacent portion of the pictured object, transparent and free for the presentation of a different color as carried by a second card behind the picture.

For more details of the invention in its preferred form, reference will be had to the accompanying drawings wherein—

Figure 1 is a view of a color selector embodying the present invention and illustrating its manner of use;

Figure 2 is a similar view with the picture sheet removed and depicting the manner in which the color sheets cooperate to present color combinations in proper relationship to the object pictured;

Figure 3 is an edge view of the color selector of Figure 1.

In its preferred form, the color selector of the present invention comprises a sheet 1 preferably of transparent material having thereon a picture 3 of an object, the color makeup of which is under consideration. In this picture the colorable portions 5 and 7 are transparent and distinguished by a line of differentiation 9 where it is contemplated that the colors of adjacent portions will meet.

Thus the particular object under consideration and illustrated in the drawings, constitutes an automobile in which the line of differentiation is that line which separates the body of the car from the superstructure. Such location of the line of differentiation is selected in the illustrated case, because in the case of an automobile, the problem of color combination usually involves the painting of the body a different color from that of the superstructure.

In conjunction with this picture sheet, I provide a plurality of color sheets 11, 13, 15 . . . etc., each being of a different color from the other and having an edge 19 coincidable with such line of differentiation. In the present instance, such edge constitutes the lower edge of the color sheet.

Such edge in the present embodiment, is so disposed as to coincide with such line of differentiation when the sheet is swung relative to said picture sheet, about a point of swing 21, to a particular position.

Each such color sheet possesses an additional edge 23 which is coincidable with the aforementioned line of differentiation when the sheet is swung about the same point of swing to a second position. Such latter edge could be the upper edge of the color sheet, but in the illustrated embodiment of the invention, the edge in question is formed by a cut-out 25 having the general size and shape of one of the colorable portions of the picture, namely, the superstructure of the automobile in the present instance. Such cut-out, among other things, functions as a guide in determining one of the positions which the color card may assume, in utilizing the same for its intended purpose.

In the illustrated embodiment of the invention, it is noted that the utilizable edges of each color card coincide with radial lines emanating from the point of swing, and consequently each color card is generally triangular in contour with its narrowest point at the point of swing.

The picture sheet, with the plurality of color sheets behind it, is assembled into a folder 27 and held therein by a rivet 29 through the point of swing, which in the illustrated embodiment of the invention, is located at one end of the picture sheet intermediate the upper and lower edges of the folder. Such single rivet holding means in conjunction with the angular shape of the color sheets, permits of the swinging movement of each color sheet through an angle sufficient to swing them out of range of the picture.

By making the picture sheet substantially rectangular at its attached end, the folder will substantially hold such picture sheet against movement about the swing axis.

In utilizing the color selector for its intended purpose, a trial color for the body of the automobile is selected from among these color sheets, and such sheet is then swung upwardly until the pertinent cut-out edge coincides with the line of differentiation, which will cause the body to show up in the color of such sheet, while leaving the superstructure transparent by reason of the cut-out in such sheet. A trial color may then be selected for such superstructure from among the remaining color sheets and such sheet moved upwardly to color in the remaining transparent portion of the picture. The operations can be repeated for many different combinations of colors until the most appealing combination has been determined upon.

While the illustrated embodiment of my invention has been applied to an automobile as the object under consideration, it is apparent that the underlying principles of the present invention may be applied to other objects, and accordingly while I have disclosed one specific embodiment of my invention and in considerable detail, I do not desire to be limited in my protection to such details, except as may be necessitated by the appended claims.

I claim:

1. A color selector comprising a sheet of material having a picture of an object, in which picture the colorable portions are transparent, said picture including a line of differentiation between portions of such object likely to receive different colorings; and a plurality of color sheets of different colors, each such color sheet having an edge coincidable with said line of differentiasheet, and a second edge coincidable with said line of differentiation when said color sheet is swung to a second position about said point of swing.

2. A color selector comprising a sheet of material having a picture of an object, in which picture the colorable portions are transparent, said picture including a line of differentiation between portions of such object likely to receive different colorings; and a plurality of color sheets of different colors, each such color sheet having an edge coincidable with said line of differentiation and a cut-out having an edge coincidable with said line of differentiation.

3. A color selector comprising a sheet of material having a picture of an object, in which picture the colorable portions are transparent, said picture including a line of differentiation between portions of such object likely to receive different colorings; and a plurality of color sheets of different colors, each such color sheet having an edge coincidable with said line of differentiation, and a cut-out of the general size and shape of one of said portions and having an edge coincidable with said line of differentiation.

4. A color selector comprising a sheet of material having thereon a picture of an object, in which picture the colorable portions are transparent, said picture including a line of differentiation between portions of such object likely to receive different colorings; and a plurality of color sheets of different colors, each such color sheet having an edge coincidable with said line of differentiation when said sheet is swung about a point of swing relative to said picture sheet, and a cut-out of the general size and shape of one of said portions and having an edge coincidable with said line of differentiation when said sheet is swung about said same point of swing.

5. A color selector comprising a sheet of material having thereon a picture of an object, in which picture the colorable portions are transparent, said picture including a line of differentiation between portions of such object likely to receive different colorings; and a plurality of color sheets of different colors, each such color sheet having an edge coincidable with said line of differentiation when said sheet is swung about a point of swing relative to said picture sheet, and a cut-out of the general size and shape of one of said portions and having an edge coincidable with said line of differentiation when said sheet is swung about said same point of swing; and means pivotally securing said sheets at said point of swing.

6. A color selector comprising a sheet of material having thereon a picture of an object, in which picture the colorable portions are transparent, said picture including a line of differentiation between portions of such object likely to receive different colorings; and a plurality of color sheets of different colors, each such color sheet having an edge coincidable with said line of differentiation when said sheet is swung about a point of swing relative to said picture sheet, and a cut-out of the general size and shape of one of said portions and having an edge coincidable with said line of differentiation when said sheet is swung about said same point of swing, each of said color sheets having sufficient area between said two edges to totally cover said picture.

7. A color selector comprising a sheet of material having thereon a picture of an object, in which picture the colorable portions are transparent, said picture including a line of differentiation between portions of such object likely to receive different colorings; a plurality of color sheets of different colors, each such color sheet having an edge coincidable with said line of differentiation when said sheet is swung about a point of swing relative to said picture sheet, and a cut-out of the general size and shape of one of said portions and having an edge coincidable with said line of differentiation when said sheet is swung about said same point of swing, each of said color sheets having sufficient area between said two edges to totally cover said picture; means substantially fixing said picture sheet against movement with respect to said point of swing and means pivotally securing said sheets at said point of swing.

ORAN VETTERLI.

REFERENCES CITED

The following references are of record in the file of this patent:

UNITED STATES PATENTS

| Number | Name | Date |
|--------|------|------|
| 799,609 | Ludwig | Sept. 12, 1905 |
| 856,222 | Church | June 11, 1907 |
| 1,832,750 | Stephens | Nov. 17, 1931 |